(12) United States Patent
Sakai

(10) Patent No.: US 9,049,587 B2
(45) Date of Patent: Jun. 2, 2015

(54) COMMUNICATION APPARATUS, CONTROL METHOD THEREFOR, PROGRAM, AND STORAGE MEDIUM

(75) Inventor: Tatsuhiko Sakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 293 days.

(21) Appl. No.: 13/140,814

(22) PCT Filed: Dec. 16, 2009

(86) PCT No.: PCT/JP2009/006912
§ 371 (c)(1),
(2), (4) Date: Jun. 17, 2011

(87) PCT Pub. No.: WO2010/073542
PCT Pub. Date: Jul. 1, 2010

(65) Prior Publication Data
US 2011/0258331 A1    Oct. 20, 2011

(30) Foreign Application Priority Data

Dec. 22, 2008 (JP) .................................. 2008-325795
Oct. 8, 2009 (JP) .................................. 2009-234415

(51) Int. Cl.
*G06F 15/16* (2006.01)
*H04W 8/24* (2009.01)
*H04W 8/00* (2009.01)
*H04W 84/18* (2009.01)

(52) U.S. Cl.
CPC ............... *H04W 8/24* (2013.01); *H04W 8/005* (2013.01); *H04W 84/18* (2013.01)

(58) Field of Classification Search
USPC ...................................................... 709/228
See application file for complete search history.

(56) References Cited

U.S. PATENT DOCUMENTS

| 6,625,750 | B1 * | 9/2003 | Duso et al. ...................... 714/11 |
| 2006/0194596 | A1 * | 8/2006 | Deng ............................. 455/466 |
| 2006/0200564 | A1 * | 9/2006 | Watanabe et al. .............. 709/227 |
| 2006/0268744 | A1 | 11/2006 | Sakai |
| 2008/0037444 | A1 | 2/2008 | Chhabra |
| 2008/0220781 | A1 * | 9/2008 | Karia et al. .................... 455/436 |
| 2010/0075650 | A1 * | 3/2010 | Tsai et al. ..................... 455/418 |

FOREIGN PATENT DOCUMENTS

| EP | 1819102 A1 | 8/2007 |
| JP | 2008-300982 A | 12/2008 |
| WO | 2008/050622 A1 | 5/2008 |

OTHER PUBLICATIONS

U.S. Appl. No. 12/996,484, filed Dec. 6, 2010.
U.S. Appl. No. 12/989,070, filed Oct. 21, 2010.
U.S. Appl. No. 12/988,781, filed Oct. 20, 2010.
U.S. Appl. No. 12/748,771, filed Mar. 29, 2010.
Japanese Office Action issued in corresponding application No. 2009-234415 on Oct. 22, 2013.

* cited by examiner

*Primary Examiner* — John B Walsh
(74) *Attorney, Agent, or Firm* — Carter, DeLuca, Farrell & Schmidt, LLP

(57) ABSTRACT

Even when multiple providing apparatuses joined in a network are activated as providing apparatuses, a new apparatus can be added to the network without degrading the network security or the ease of use of the providing apparatuses, a apparatus activates an operation as a providing apparatus of a communication-parameter in accordance with the a state notification of an operation as a providing apparatus of a communication-parameter, which is received from another communication apparatus.

13 Claims, 9 Drawing Sheets

COMMUNICATION APPARATUS, CONTROL METHOD THEREFOR, PROGRAM, AND STORAGE MEDIUM

TECHNICAL FIELD

The present invention relates to a communication apparatus that executes a communication-parameter setting process with another communication apparatus, a control method for the communication apparatus, a program, and a storage medium.

BACKGROUND ART

In wireless communication represented by wireless local area networks (LANs) conforming to the Institute of Electrical and Electronics Engineers (IEEE) 802.11 standard series, there are many setting items that must be set prior to use.

For example, as setting items, there are communication parameters needed to perform wireless communication, such as the Service Set Identifier (SSID) which is a network identifier, an encryption method, an encryption key, an authentication method, and an authentication key. It is very complicated for the user to manually enter and set these communication parameters.

Therefore, various manufacturers have devised automatic setting methods for easily setting communication parameters in wireless devices. In these automatic setting methods, one device provides communication parameters to another device connected thereto using a procedure and messages determined in advance between these connected devices, and accordingly the communication parameters are automatically set.

Patent Citation 1 discloses an example of automatically setting communication parameters in wireless local area network (LAN) ad-hoc mode communication (hereinafter called ad-hoc communication).

The case where a new device is added, by using communication-parameter automatic setting, to an ad-hoc network configured by using communication-parameter automatic setting will be considered.

In this case, a device joined in the network is activated as a device that provides parameters (hereinafter called a providing apparatus), and the providing apparatus provides communication parameters of the network to a device newly added (hereinafter called a receiving apparatus).

The case where multiple providing apparatuses are activated by multiple users who simultaneously operate multiple devices joined in the network will be considered.

In this case, the receiving apparatus performs communication-parameter automatic setting with only one of the activated providing apparatuses. Thus, there is at least one providing apparatus that does not provide communication parameters to the receiving apparatus.

The providing apparatus that does not provide communication parameters to the receiving apparatus remains to be able to provide communication apparatus to another device until a timeout occurs.

Therefore, the providing apparatus may perform communication-parameter automatic setting with another unintended receiving apparatus. This means that communication parameters may be mistakenly provided, resulting in a network security problem. When the providing apparatus activates its communication-parameter automatic setting function, the providing apparatus cannot perform other operations until the activated function is deactivated. It is therefore inconvenient to use the providing apparatus.

CITATION LIST

Patent Literature

PTL 1: US 2006/0268744 (Japanese Patent Laid-Open No. 2006-311139)

SUMMARY OF INVENTION

The present invention provides techniques that make it possible to add a new device to a network, even when devices joined in the network are activated as providing apparatuses, without degrading the network security or the ease of use of the providing apparatuses.

Solution to Problem

A communication apparatus according to an aspect of the present invention includes a providing means; a receiving means; and a control means. The providing means is configured to operate as a providing apparatus that provides a communication parameter to a receiving apparatus that receives a provided communication parameter. The receiving means is configured to receive, from another communication apparatus, a state notification of an operation as a providing apparatus of a communication-parameter. The control means is configured to control an operation of the providing unit as a providing apparatus in accordance with the state notification received by the receiving means.

DESCRIPTION OF EMBODIMENTS

First Embodiment

A communication apparatus according to an embodiment of the present invention will now herein be described in detail with reference to the drawings. Although the following description concerns an example in which a wireless LAN system conforming to the IEEE 802.11 series is employed, the communication configuration is not necessarily limited to a wireless LAN conforming to IEEE 802.11.

An exemplary hardware configuration in the embodiment will be described.

Figure 1:
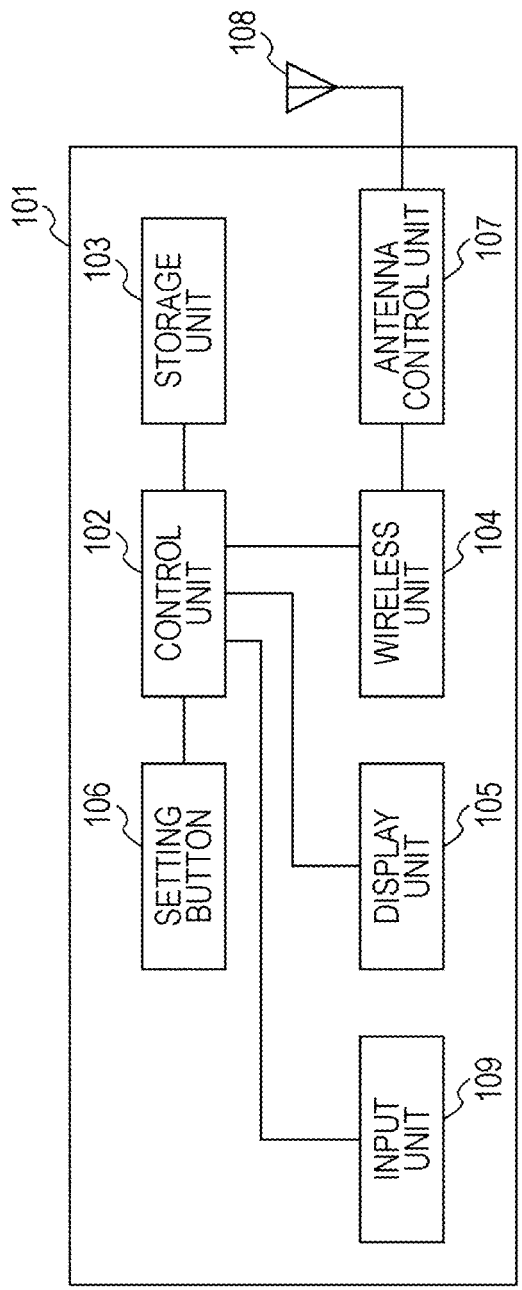
FIG. 1 is a block diagram of an apparatus.

FIG. 1 is a block diagram illustrating an exemplary structure of each apparatus, which will be described later, according to an embodiment of the present invention. FIG. 1 illustrates the entirety of an apparatus 101. A control unit 102 controls the entire apparatus 101 by executing a control program stored in a storage unit 103. The control unit 102 additionally controls setting of communication parameters with another apparatus. The storage unit 103 stores the control program executed by the control unit 102 and various items of information, such as communication parameters. Various operations described later are performed by executing, with the control unit 102, the control program stored in the storage unit 103.

A wireless unit 104 performs wireless communication. A display unit 105 performs various displays. The display unit 105 has a function of outputting information in a visually recognizable manner, as in a liquid crystal display (LCD) or a light-emitting diode (LED), or a function of outputting sounds, as in a loudspeaker.

A setting button 106 is used for triggering or starting a communication-parameter setting process. Upon detection of an operation entered by a user using the setting button 106, the control unit 102 activates a communication-parameter automatic setting function, which will be described later. The automatic setting function includes a providing function and a receiving function. The providing function executes a providing process. The receiving function executes a receiving process.

An antenna control unit 107 controls an antenna 108. An input unit 109 is operated by the user to enter various instructions and commands.

Figure 2:
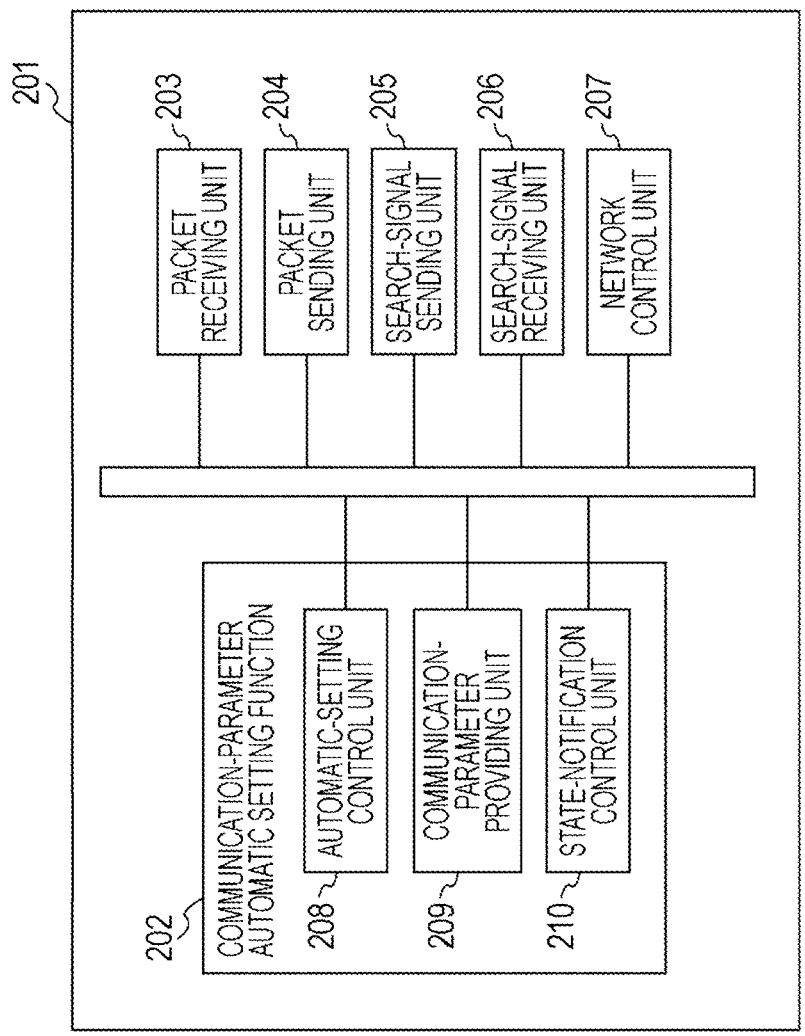
FIG. 2 is a software functional block diagram of the interior of a providing apparatus according to an embodiment of the present invention.

FIG. 2 is a block diagram illustrating an exemplary configuration of software function blocks performed by an apparatus that provides communication parameters (hereinafter called a providing apparatus) in a communication-parameter setting operation described later.

FIG. 2 illustrates the entirety of an apparatus 201. The apparatus 201 includes a communication-parameter automatic setting function block 202. In this embodiment, automatic setting of communication parameters needed to perform wireless communication, such as the SSID which is a network identifier, an encryption method, an encryption key, an authentication method, and an authentication key, is performed.

A packet receiving unit 203 receives packets related to various communications. Receiving of a beacon (broadcast signal) is performed by the packet receiving unit 203. A packet sending unit 204 sends packets related to various communications. Sending of a beacon is performed by the packet sending unit 204. Various items of information (self-information) of the sending source device are added to a beacon.

A search-signal sending unit 205 controls sending of a device search signal, such as a probe request. A probe request may be a network search signal for searching for a desired network. Sending of a probe request is performed by the search-signal sending unit 205. Also, sending of a probe response, which is a response signal to a received probe request, is performed by the search-signal sending unit 205.

A search-signal receiving unit 206 controls receiving of a device search signal, such as a probe request, from another apparatus. Receiving of a probe request is performed by the search-signal receiving unit 206. Also, receiving of a probe response is performed by the search-signal receiving unit 206. Various items of information (self-information) of the sending source device are added to a device search signal and a response signal in response thereto.

A device operates as a providing apparatus when a communication-parameter providing function is activated. The device adds self-information indicating that the device is a providing apparatus to a beacon and a probe signal, and sends the beacon and the probe signal. When the device stops operating as a communication-parameter providing apparatus, the device deletes the self-information indicating that the device is a providing apparatus from a beacon and a probe signal.

A network control unit 207 controls a network connection. A process of connecting to a wireless LAN ad-hoc network, for example, is performed by the network control unit 207.

In the communication-parameter automatic setting function block 202, an automatic-setting control unit 208 controls various protocols in communication-parameter automatic setting.

A communication-parameter providing unit 209 provides communication parameters to a partner device. Under control of the automatic-setting control unit 208, a providing process in a communication-parameter automatic setting, which will be described later, is performed by the communication-parameter providing unit 209.

Also, the automatic-setting control unit 208 determines whether a time elapsed since the device has become a providing apparatus by activating the communication-parameter providing function has exceeded a time limit. When it is determined that the elapsed time has exceeded the time limit, the automatic-setting control unit 208 performs control to deactivate the device as a providing apparatus.

A state notification control unit 210 controls a process of sending notifications of the state of the communication-parameter automatic setting function.

Sending of a state notification message indicating the state of the communication-parameter providing function, which will be described later, is performed by the state notification control unit 210. Also, receiving of a state notification message in the providing apparatus, which will be described later, is performed by the state notification control unit 210.

A specific method of sending a state notification message is, for example, adding information regarding the state of the communication-parameter providing function to a beacon signal or a probe signal and broadcasting the beacon signal or the probe signal. Alternatively, a state notification message may be sent by using another signal that can be sent by using wireless LAN communication.

Possible state notification messages include, for example, an activation notification indicating that the providing function of the device is active and the device is being activated as a providing apparatus, a state notification indicating the start of message exchange with a receiving apparatus, and a completion notification indicating completion of a providing process. That is, an apparatus that has received a state notification message can recognize that there exists an apparatus that is activated and operating as a communication-parameter providing apparatus (or that was activated as a communication-parameter providing apparatus (that completed a communication-parameter providing process)).

Figure 3:
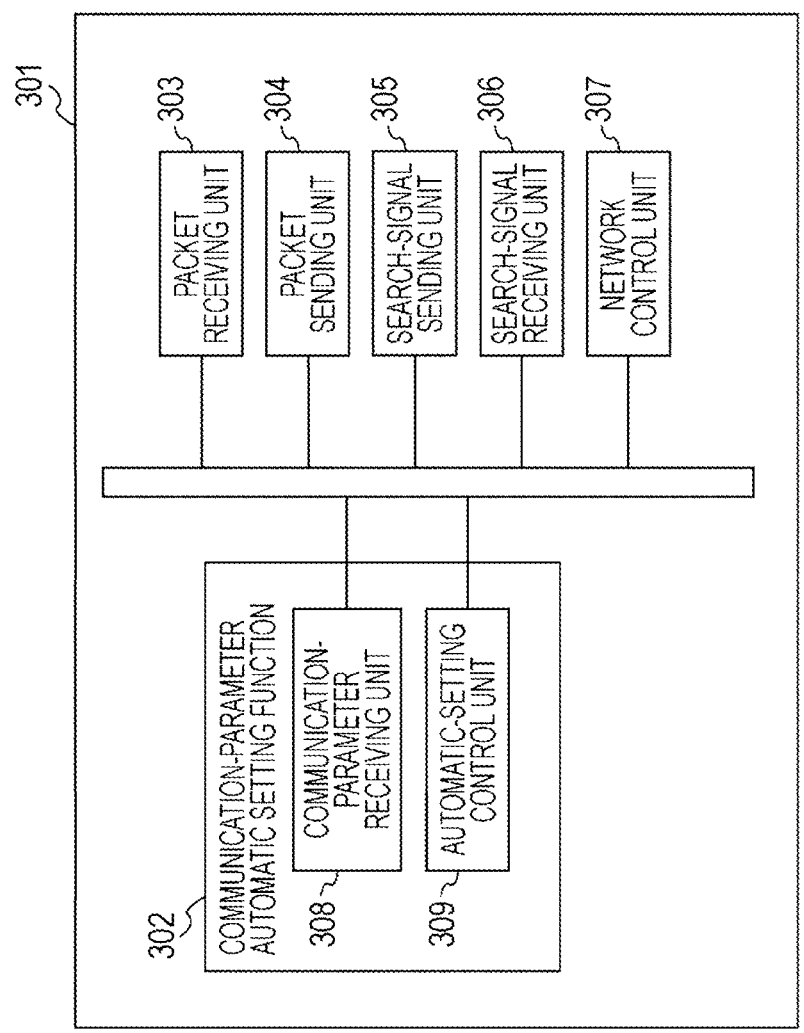
FIG. 3 is a software functional block diagram of the interior of a receiving apparatus according to the embodiment of the present invention.

FIG. 3 is a block diagram illustrating an exemplary configuration of software function blocks performed by an apparatus that receives communication parameters (hereinafter called a receiving apparatus) in a communication-parameter setting operation described later.

FIG. 3 illustrates the entirety of an apparatus 301. The apparatus 301 includes a communication-parameter automatic setting function block 302. In this embodiment, automatic setting of communication parameters needed to perform wireless communication, such as the SSID which is a network identifier, an encryption method, an encryption key, an authentication method, and an authentication key, is performed.

A packet receiving unit 303 receives packets related to various communications. Receiving of a beacon (broadcast signal) is performed by the packet receiving unit 303. A packet sending unit 304 sends packets related to various communications. Sending of a beacon is performed by the packet sending unit 304. Various items of information (self-information) of the sending source device are added to a beacon.

A search-signal sending unit 305 controls sending of a device search signal, such as a probe request. A probe request may be a network search signal for searching for a desired network. Sending of a probe request is performed by the search-signal sending unit 305. Also, sending of a probe response, which is a response signal to a received probe request, is performed by the search-signal sending unit 305.

A search-signal receiving unit 306 controls receiving of a device search signal, such as a probe request, from another apparatus. Receiving of a probe request is performed by the search-signal receiving unit 306. Also, receiving of a probe response is performed by the search-signal receiving unit 306. Various items of information (self-information) of the sending source device are added to a device search signal and a response signal in response thereto.

The receiving apparatus detects the presence of a providing apparatus by sending a device search signal and receiving a response signal that is sent from the providing apparatus and that includes self-information indicating that the sender is a providing apparatus. Alternatively, the receiving apparatus detects the presence of a providing apparatus when the providing apparatus sends a beacon including self-information indicating that the sender is a providing apparatus, and the receiving apparatus receives the beacon.

A network control unit 307 controls a network connection. A process of connecting to a wireless LAN ad-hoc network, for example, is performed by the network control unit 307.

In the communication-parameter automatic setting function block 302, a communication-parameter receiving unit 308 receives communication parameters from a partner device.

An automatic-setting control unit 309 controls various protocols in communication-parameter automatic setting.

When the receiving apparatus detects the presence of a providing apparatus, the receiving apparatus joins in a network of the providing apparatus by using the network control unit 307 under control of the automatic-setting control unit 309. After the participation, under control of the automatic-setting control unit 309, the receiving apparatus exchanges messages for receiving parameters with the providing apparatus by using the communication-parameter receiving unit 308, and receives communication parameters from the providing apparatus.

Also, the automatic-setting control unit 309 determines whether a time elapsed since the device has become a receiving apparatus by activating the communication-parameter automatic setting function has exceeded a time limit. When it is determined that the elapsed time has exceeded the time limit, the automatic-setting control unit 309 performs control to deactivate the device as a receiving apparatus.

Figure 4:
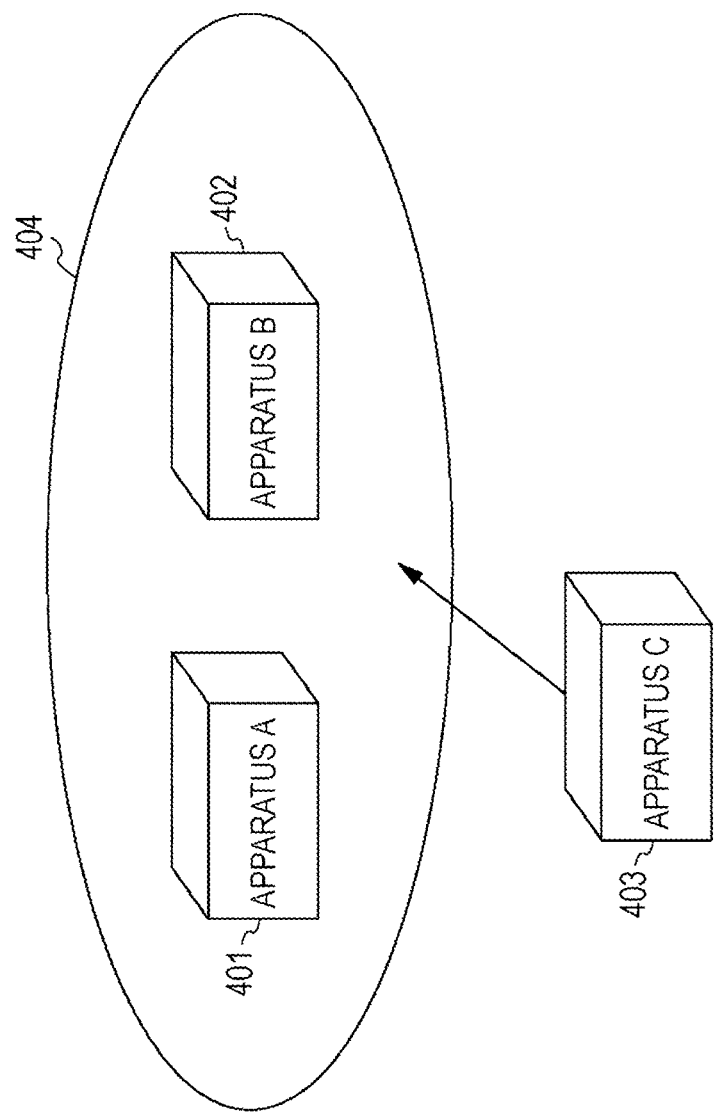
FIG. 4 is a network diagram according to the embodiment of the present invention.

FIG. 4 is a diagram illustrating a communication apparatus A401 (hereinafter called an apparatus A), a communication apparatus B402 (hereinafter called an apparatus B), a communication apparatus C403 (hereinafter called an apparatus C), and a network 404. The apparatus A and the apparatus B each have a communication-parameter providing function and a structure as a providing apparatus illustrated in FIGS. 1 and 2 described above. The apparatus C has a communication-parameter receiving function and a structure as a receiving apparatus illustrated in FIGS. 1 and 3. The apparatus A and the apparatus B are joining in network 404.

The case where a setting button of the apparatus C is operated when the apparatus C joins in the ad-hoc network 404 including the apparatus A and the apparatus B will be considered. When the setting button is operated, each of the apparatus A and the apparatus B activates the communication-parameter automatic setting function and is activated as a providing apparatus for providing communication parameters. When the setting button is operated, the apparatus C activates the communication-parameter automatic setting function and is activated as a communication-parameter receiving apparatus.

Figure 5:
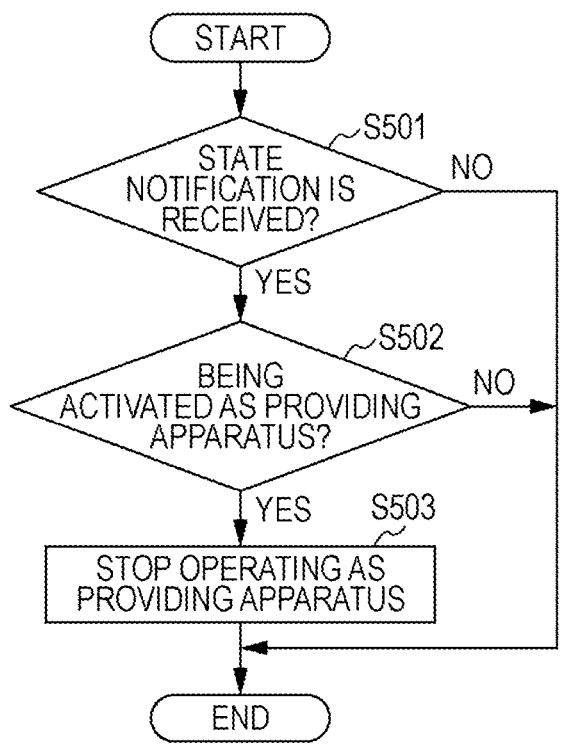
FIG. 5 is a flowchart illustrating an operation of the providing apparatus at the time a state notification is received.

FIG. 5 is a flowchart illustrating an operation when a providing apparatus receives a state notification message from another providing apparatus. When a providing apparatus receives a message by using wireless LAN communication, the process illustrated in FIG. 5 is started.

After the process is started, the providing apparatus determines whether the received message is a state notification message (S501).

When the received message is a message other than a state notification message, the process is terminated. When the received message is a state notification message, it is determined that there exists an apparatus being activated as a communication-parameter providing apparatus (or an apparatus that has completed and terminated a communication-parameter providing process), and the providing apparatus determines whether the providing apparatus itself is being activated as a communication-parameter providing apparatus (S502).

When the providing apparatus is not being activated as a providing apparatus, the process is terminated. When the providing apparatus is being activated as a providing apparatus, since there is another apparatus that is being activated as a providing apparatus (or another apparatus that has completed a communication-parameter providing process), the providing apparatus stops operating as a providing apparatus (S503), and terminates the process.

In this manner, when the providing apparatus receives a state notification message and detects that another apparatus is being activated as a providing apparatus, the providing apparatus stops operating as a providing apparatus. Accordingly, when the other providing apparatus provides communication parameters to the receiving apparatus, the providing apparatus can be prevented from operating as a providing apparatus and uselessly and continuously operating as a providing apparatus.

Figure 6:
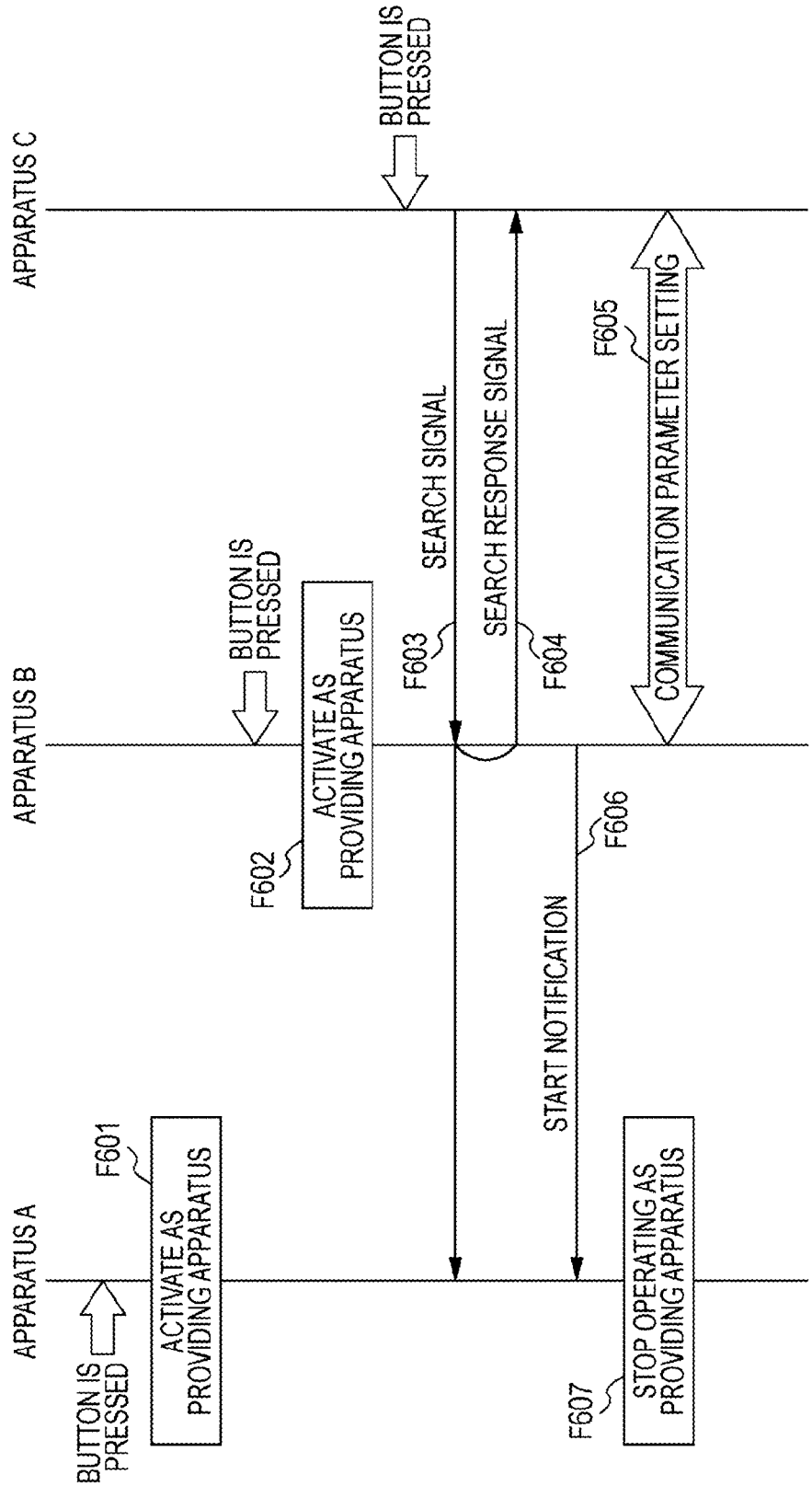
FIG. 6 is a sequence diagram illustrating operations of an apparatus A, an apparatus B, and an apparatus C at the time a start notification is sent.
Figure 7:
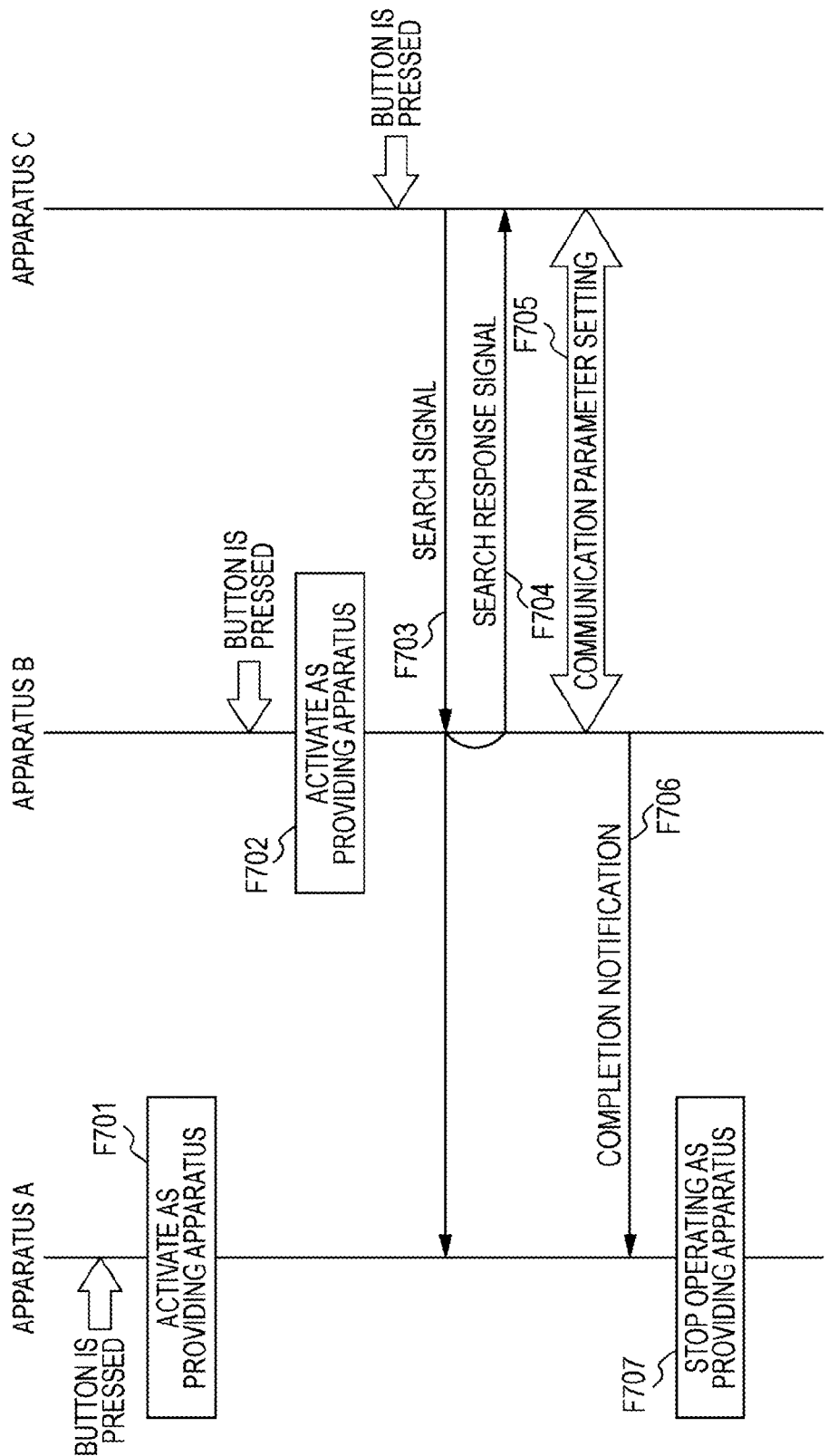
FIG. 7 is a sequence diagram illustrating operations of the apparatus A, the apparatus B, and the apparatus C at the time a completion notification is sent.

FIGS. 6 and 7 are sequence diagrams illustrating an operation of each apparatus in the present embodiment.

FIG. 6 illustrates an operation when a providing apparatus sends, as a state notification message, a start notification message that notifies a receiver of the fact that the providing apparatus has started message exchange with a receiving apparatus.

When the setting buttons of the apparatus A and the apparatus B are operated by the users, the apparatus A and the apparatus B each activate an operation as a communication-parameter providing apparatus (F601 and F602).

When the setting button of the apparatus C is operated by the user, the apparatus C activates an operation as a communication-parameter receiving apparatus and sends a search signal for detecting the presence of a providing apparatus (F603).

Upon receipt of the search signal sent from the apparatus C, the apparatus B sends a search response signal including self-information indicating that the apparatus B is a providing apparatus to the apparatus C (F604).

Upon receipt of the search response signal sent from the apparatus B, the apparatus C detects that the apparatus B is a providing apparatus by referring to the details of the search response signal. After the detection, the apparatus C joined in the network 404 and exchanges messages with the apparatus B, thereby receiving communication parameters of the network 404 from the apparatus B (F605).

When the apparatus B starts message exchange for providing communication parameters to the apparatus C, the apparatus B sends a start notification message to other devices joined in the network 404 (F606).

The apparatus A, which has received the start notification message, performs the state notification receiving process described with reference to FIG. 5, and stops operating as a communication-parameter providing apparatus (F607).

Next, FIG. 7 illustrates an operation when a providing apparatus sends, as a state notification message, a completion notification message that notifies a receiver of the fact that providing of communication parameters to a receiving apparatus has been completed.

When the setting buttons of the apparatus A and the apparatus B are operated by the users, the apparatus A and the apparatus B each activate an operation as a communication-parameter providing apparatus (F701 and F702).

When the setting button of the apparatus C is operated by the user, the apparatus C is activated as a communication-parameter receiving apparatus and sends a search signal for detecting the presence of a providing apparatus (F703).

Upon receipt of the search signal sent from the apparatus C, the apparatus B sends a search response signal including self-information indicating that the apparatus B is a providing apparatus to the apparatus C (F704).

Upon receipt of the search response signal sent from the apparatus B, the apparatus C detects that the apparatus B is a providing apparatus by referring to the details of the search response signal. After the detection, the apparatus C joins in the network 404 and exchanges messages with the apparatus B, thereby receiving communication parameters of the network 404 from the apparatus B (F705).

When the apparatus B completes providing communication parameters to the apparatus C, the apparatus B sends a completion notification message to other devices joined in the network 404 (F706).

The apparatus A, which has received the completion notification message, performs the state notification receiving process described with reference to FIG. 5, and stops operating as a communication-parameter providing apparatus (F707).

According to the present embodiment, even in the case where there exist multiple providing apparatuses that are participating in a network, when one providing apparatus that provides communication parameters sends a state notification message, the other apparatus can stop operating as a providing apparatus. Therefore, the other apparatus is prevented from uselessly and continuously operating as a providing apparatus, and the other apparatus can stop operating as a providing apparatus more quickly than a conventional equivalent apparatus. Accordingly, the risk of providing communication parameters to an unintended receiving apparatus can be reduced. Also, the user of the other providing apparatus can quickly perform other operations.

When the providing apparatus stops operating as a communication-providing providing apparatus, the providing apparatus may notify, by using the display unit 105, the user of the fact that the providing apparatus stops operating as a providing apparatus since there exists another providing apparatus. When the providing apparatus receives the completion notification message, the providing apparatus may notify, by using the display unit 105, the user of the fact that providing of communication parameters to the receiving apparatus has been completed.

When the providing apparatus starts and/or completes its operation as a providing apparatus, the providing apparatus may send a state notification message(s). When state notification messages are sent at multiple times, the receiving possibility is increased even when a message reception error occurs. As a result, the providing apparatus can more reliably stop operating as a providing apparatus.

In the foregoing description, the case where the communication-parameter providing apparatus sends a state notification message has been described. Next, the case where, when the setting button of the providing apparatus is operated, the providing apparatus sends, as a state notification message, an activation notification message that notifies a receiver of the fact that the providing apparatus is activating its operation as a communication-parameter providing apparatus will be described using FIGS. 8, 9 and 10.

Figure 8:
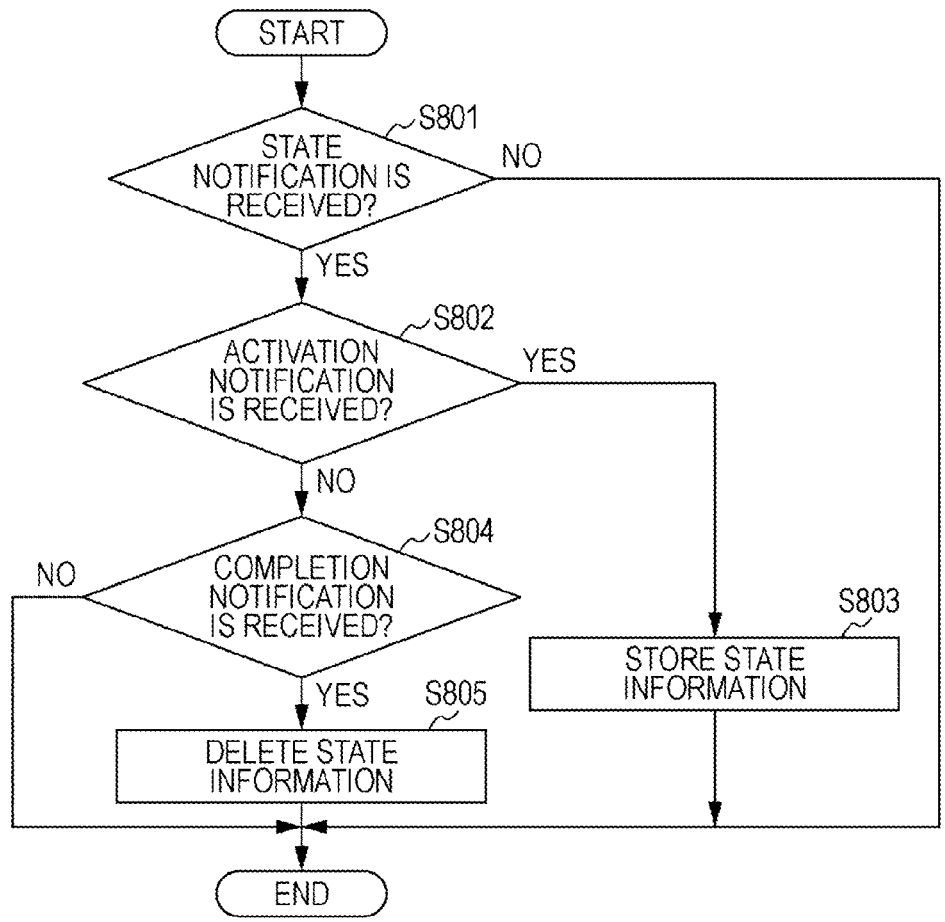
FIG. 8 is a flowchart illustrating a second operation of the providing apparatus at the time a state notification is received.

FIG. 8 is a flowchart illustrating a second operation when a providing apparatus receives a state notification message from another providing apparatus. When a providing apparatus receives a message by using wireless LAN communication, the process illustrated in FIG. 8 is started.

After the process is started, the providing apparatus determines whether the received message is a state notification message (S801).

When the received message is a message other than a state notification message, the process is terminated. When the received message is a state notification message, it is determined whether the received state notification message is an activation notification message that notifies a receiver of the fact that the sender is being activated as a communication-parameter providing apparatus (S802).

When the received state notification message is an activation notification message, state information indicating that another providing apparatus is being activated as a providing apparatus is stored in the storage unit 103 (S803), and the process is terminated. When the received state notification message is not an activation notification message, it is determined whether the received state notification message is a completion notification message that notifies a receiver of the fact that providing of communication parameters has been completed (S804).

When the received state notification message is a completion notification message, the state information stored in the storage unit 103 is deleted (S805), and the process is terminated. When the received state notification message is not a completion notification message, the process is terminated.

Figure 9:
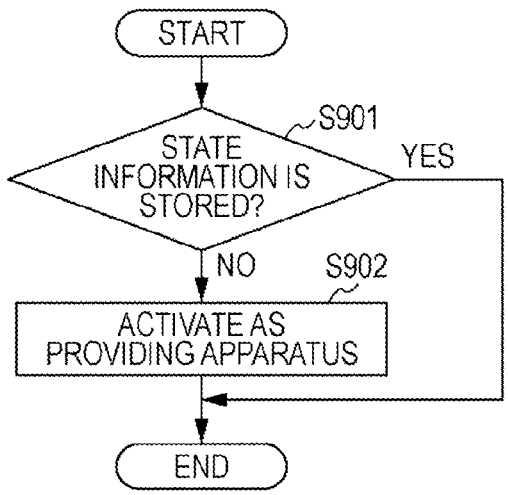
FIG. 9 is a flowchart illustrating an operation of the providing apparatus at the time a setting button is operated.

FIG. 9 is a flowchart illustrating an operation when the setting button 106 is operated in a providing apparatus.

When the setting button 106 is operated, the providing apparatus refers to the storage unit 103, and determines whether state information indicating that another communication apparatus is being activated as a providing apparatus is stored (S901).

When the state information is stored, the providing apparatus is not activated as a providing apparatus, and the process is terminated. When the process is terminated, the user may be informed of the fact that another apparatus is being activated as a providing apparatus by using the display unit 105. When the state information is not stored in the storage unit 103, the providing apparatus is activated as a communication-parameter providing apparatus (S902).

Figure 10:
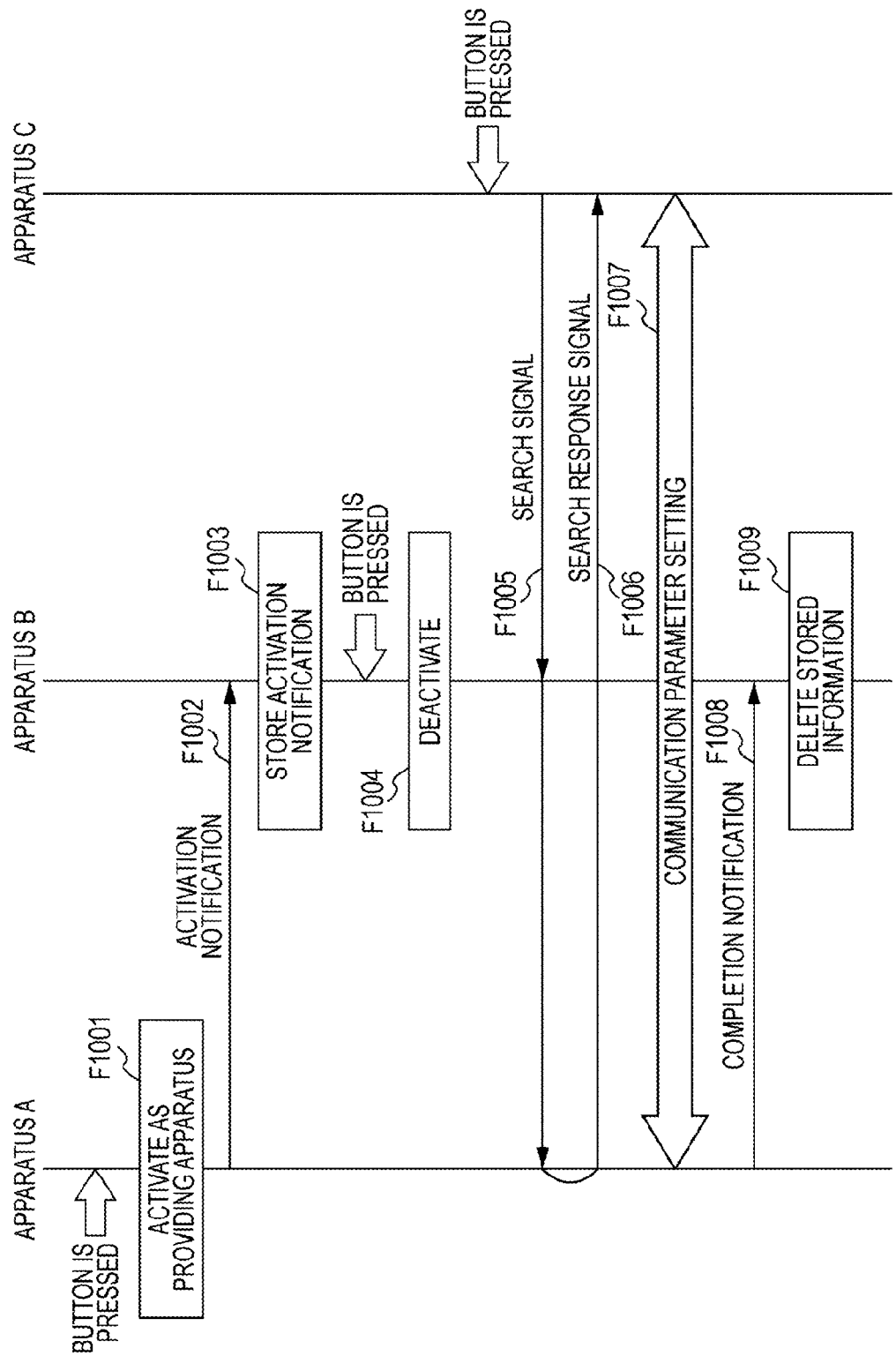
FIG. 10 is a sequence diagram illustrating operations of the apparatus A, the apparatus B, and the apparatus C at the time an activation notification is sent.

FIG. 10 is a sequence diagram illustrating an operation of each apparatus when an activation notification message is sent as a state notification message.

When the user operates the setting button of the apparatus A, the apparatus A is activated as a communication-parameter providing apparatus (F1001). After the activation, the apparatus A sends an activation notification message to other devices joined in the network 404 (F1002).

The apparatus B, which has received the activation notification message, performs the state notification receiving process described with reference to FIG. 8, and stores state information indicating that another communication apparatus has started operating as a providing apparatus (F1003).

Thereafter, when the user operates the setting button of the apparatus B, the apparatus B performs the process described with reference to FIG. 9, and deactivates the apparatus B as a communication-parameter providing apparatus (F1004).

Then, when the user operates the setting button of the apparatus C, the apparatus C is activated as a communication-parameter receiving apparatus, and sends a search signal for detecting the presence of a providing apparatus (F1005).

Upon receipt of the search signal sent from the apparatus C, the apparatus A sends a search response signal including self-information indicating that the apparatus A is a providing apparatus to the apparatus C (F1006).

Upon receipt of the search response signal sent from the apparatus A, the apparatus C detects that the apparatus A is a providing apparatus by referring to the details of the search response signal. After the detection, the apparatus C joins in the network 404 and exchanges messages with the apparatus A, thereby receiving communication parameters of the network 404 from the apparatus A (F1007).

When the apparatus A completes providing communication parameters to the apparatus C, the apparatus A sends a completion notification message to other devices joined in the network 404 (F1008).

The apparatus B, which has received the completion notification message, performs the state notification receiving process described with reference to FIG. 8, and deletes the stored state information (F1009).

Accordingly, when an apparatus detects, from a state notification message, that another apparatus is being activated as a providing apparatus and stores information indicating that the other apparatus is being activated as a providing apparatus, the apparatus can be prevented from being uselessly activated as a providing apparatus.

Therefore, even when multiple devices joining in a network are activated as providing apparatuses, a new device can be relatively safely added to the network. Also, a new device can be added to the network without degrading the ease of use of the providing apparatuses.

Although the preferred embodiment of the present invention has been descried above, this is for illustrative purposes only, and the scope of the present invention is not restricted to the embodiment. Various modifications can be made to the embodiment without departing from the gist of the present invention.

The foregoing description concerns the case where the wireless LAN conforming to IEEE 802.11 is used by way of example. However, the present invention is applicable to other wireless media such as a wireless universal serial bus (USB), MultiBand Orthogonal frequency-division multiplexing (OFDM) Alliance (MBOA), Bluetooth (registered trademark), ultra-wideband (UWB), and Zigbee. Alternatively, the present invention is applicable to a wired communication medium such as a wired LAN.

UWB includes a wireless USB, wireless 1394, WiNET, and the like.

Although the network identifier, the encryption method, the encryption key, the authentication method, and the authentication key serve as communication parameters in the description of the foregoing embodiments, other information may serve as communication parameters. That is, communication parameters include other information.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-325795, filed Dec. 22, 2008, and Japanese Patent Application No. 2009-234415, filed Oct. 8, 2009, which are hereby incorporated by reference herein in their entirety.

The invention claimed is:

1. A communication apparatus, comprising:
a providing unit configured to operate as a providing apparatus that provides communication parameters to a receiving communication apparatus that receives the provided communication parameters;
a receiving unit configured to receive, from another communication apparatus configured to operate as a providing apparatus that provides communication parameters to the receiving communication apparatus, a state notification message, which indicates a start or end of a communication-parameters providing process performed by the another communication apparatus and is provided by the another communication apparatus configured to operate as the providing apparatus; and
a control unit configured to store state notification information in a memory of the communication apparatus at the start of the communication-parameters providing process performed by the another communication apparatus and to delete the state notification information from the memory of the communication apparatus at the end of the communication-parameters providing process performed by the another communication apparatus,
wherein the communication apparatus does not perform the communication-parameters providing process as a providing apparatus in a case where the state notification information is stored in the memory.

2. The communication apparatus according to claim 1, further comprising a management unit configured to manage status information of a communication-parameters providing process performed by the another providing apparatus.

3. The communication apparatus according to claim 1, wherein, when it is determined that the another communication apparatus is being activated as a providing apparatus for providing communication parameters, the control unit does not activate the providing unit.

4. The communication apparatus according to claim 1, further comprising a notification unit configured to notify the another communication apparatus that it has been selected to transmit the communication parameters to the receiving communication apparatus.

5. The communication apparatus according to claim 1, further comprising a stop unit configured to stop an operation of the providing unit as a providing apparatus, in a case where the state notification message is received during activation of the operation of the providing unit as a providing apparatus.

6. A control method for a communication apparatus, the control method comprising:
operating as a providing apparatus that provides communication parameters to a receiving communication apparatus that receives the provided communication parameters;
receiving, from another communication apparatus configured to operate as a providing apparatus that provides communication parameters to the receiving communication apparatus, a state notification message, which indicates a start or end of a communication-parameters providing process performed by the another communication apparatus and is provided by the another communication apparatus configured to operate as the providing apparatus;
storing state notification information in a memory of the communication apparatus at the start of the communication-parameters providing process performed by the another communication apparatus; and
deleting the state notification information from the memory of the communication apparatus at the end of the communication-parameters providing process performed by the another communication apparatus,
wherein the communication apparatus does not perform the communication-parameters providing process as a providing apparatus in a case where the state notification information is stored in the memory.

7. The method according to claim 6, further comprising managing status information of a communication-parameters providing process performed by the another providing apparatus.

8. The method according to claim 6, further comprising stopping activation of the providing apparatus when it is determined that the another communication apparatus is being activated as a providing apparatus for providing communication parameters.

9. The method according to claim 6, further comprising notifying the another communication apparatus that it has been selected to transmit the communication parameters to the receiving communication apparatus.

10. A non-transitory computer-readable storage medium storing a computer-executable program of instructions for causing a computer to perform a control method for a communication apparatus, the control method comprising:
operating as a providing apparatus that provides communication parameters to a receiving communication apparatus that receives the provided communication parameters;
receiving, from another communication apparatus configured to operate as a providing apparatus that provides communication parameters to the receiving communication apparatus, a state notification message, which indicates a start or end of a communication-parameters providing process performed by the another communication apparatus and is provided by the another communication apparatus configured to operate as the providing apparatus;
storing state notification information in a memory of the communication apparatus at the start of the communication-parameters providing process performed by the another communication apparatus; and
deleting the state notification information from the memory of the communication apparatus at the end of the communication-parameters providing process performed by the another communication apparatus,
wherein the communication apparatus does not perform the communication-parameters providing process as a providing apparatus in a case where the state notification information is stored in the memory.

11. The non-transitory computer-readable storage medium according to claim 10, wherein the method further comprises managing status information of a communication-parameters providing process performed by the another providing apparatus.

12. The non-transitory computer-readable storage medium according to claim 10, wherein the method further comprises stopping activation of the providing apparatus when it is determined that the another communication apparatus is being activated as a providing apparatus for providing communication parameters.

13. The non-transitory computer-readable storage medium according to claim 10, wherein the method further comprises notifying the another communication apparatus that it has been selected to transmit the communication parameters to the receiving communication apparatus.

* * * * *